Figure 1:
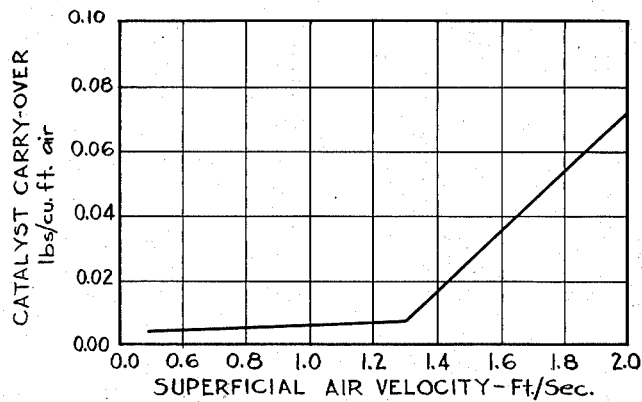
Figure 2:
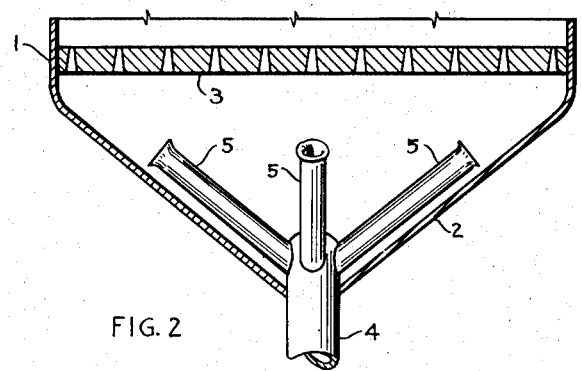
Figure 3:
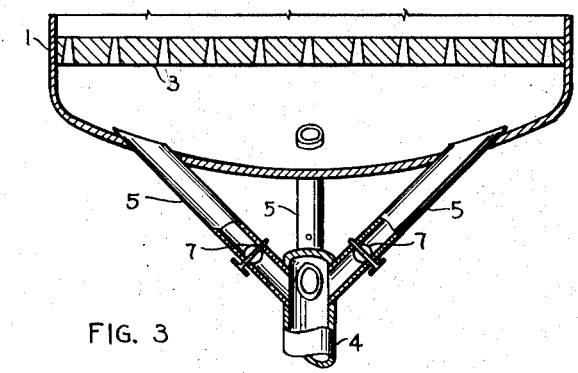

Aug. 26, 1952 A. S. GILLIAM 2,608,474
APPARATUS FOR CONTACTING GASEOUS FLUIDS WITH POWDERED SOLIDS
Filed Jan. 14, 1949

INVENTOR:
ALPHA STEVENS GILLIAM
BY
HIS ATTORNEY

Patented Aug. 26, 1952

2,608,474

UNITED STATES PATENT OFFICE 2,608,474

APPARATUS FOR CONTACTING GASEOUS FLUIDS WITH POWDERED SOLIDS

Alpha Stevens Gilliam, Houston, Tex., assignor to Shell Development Company, San Francisco, Calif., a corporation of Delaware Application January 14, 1949, Serial No. 70,866

2 Claims. (Cl. 23—288)

This invention relates to an improved method and apparatus for contacting gaseous fluids with powdered solids. A particular aspect of the invention relates to the catalytic cracking of hydrocarbon oils using the fluidized catalyst technique.

An object of the invention is to provide an improvement in the method and apparatus for contacting gaseous fluids with fluidized, finely divided catalysts or other solid substances which is adapted for large scale use and affords or allows one or more of the following: (1) an increase in the efficiency of contact, (2) a higher throughput without increasing the carry-over, (3) a decreased carry-over at the same throughput, (4) the use of higher pressures through the use of vessels having an elliptical bottom closure, (5) the compression costs to be decreased through the use of a lower pressure drop through the grid and contacting vessel, (6) any original or developed abnormalities in the distribution of the gaseous fluid in the fluidized bed to be corrected without shutting down the plant or rebuilding or altering the apparatus.

It is frequently desired to contact a gaseous fluid with a solid material, as for example in carrying out certain catalytic treatments, absorption processes, and the like. In many of these cases various advantages may be obtained by contacting the gaseous fluid with the solid material while the latter is in the so-called fluidized or pseudo liquid state. In this method the solid in a finely divided or powdered form, e. g. passing a 100 mesh sieve, is placed in a suitable vessel and the gaseous fluid to be contacted therewith is passed upwardly through the bed of solid material at such a rate that the latter becomes fluidized, i. e. assumes a pseudo liquid state. For further particulars regarding this so-called fluidized catalyst technique reference is made to The Petroleum Refiner 25, pp. 435–442 (1946), Chemical Engineering 54, pp. 105–108 (1947) and Industrial and Engineering Chemistry 35, pp. 768–773 (1943). The best example of an application of this technique is the so-called fluidized catalyst catalytic cracking process now widely used for the cracking and treatment of hydrocarbon oils.

When contacting a gaseous fluid with a solid using this so-called fluidized solid technique the density of the fluidized solid is a function of the velocity of the gaseous fluid passing up through the bed. The velocity of the gaseous fluid is usually expressed in terms of the so-called superficial velocity. The superficial velocity is the velocity that would prevail if the contacting zone were empty of solids and is therefore dependent only upon the amount of gaseous fluid passed through the contacting chamber. As the velocity of the gaseous fluid is increased the density of the bed decreases until the solid particles are all freely suspended in the gaseous fluid and the pseudo liquid condition is destroyed.

The gaseous fluid leaving the fluidized bed carries with it a small amount of the solid particles in suspension. The amount of solid carried in free suspension in the gaseous fluid (so-called carry-over) increases with increasing superficial gas velocity. The concentrations of solid in pounds per cubic foot at differential superficial velocities of air are graphically shown for the case of a typical cracking catalyst in the attached drawing, Figure I.

It will be evident that the superficial gas velocity is an important variable governing the efficiency of the process. A low superficial velocity affords a dense fluidized bed and a low rate of carry-over, but affords only a small throughput. A high superficial gas velocity affords a high throughput rate, but results in a less dense fluidized bed and large amounts of carry-over. In processes employing the so-called fluidized solid technique it is the practice to design the contacting vessel for a superficial gas velocity in the order of 0.5 to 2.0 feet per second.

With the superficial gas velocity thus fixed or determined by the requirements as to bed density the desired contact time of the gas with the fluidized solid is dependent upon the height, i. e., depth, of the fluidized bed. This latter is, therefore, fixed or determined by the contact time required for the process. In catalytic cracking, for example, the fluidized bed is approximately 10–15 feet deep.

With the superficial gas velocity and depth of the fluidized bed fixed by the process requirements as described, the only means for adjusting for the desired throughput in a given reactor are by adjusting the horizontal cross-sectional area of the fluidized bed and/or by adjusting the pressure. In most cases the desired operating pressure is dependent upon other factors, thus leaving the cross-sectional area as the sole variable to be adjusted. The horizontal cross-sectional area of the fluidized bed is usually expressed in terms of the effective diameter of the bed, which is the diameter of a circle having the same horizontal cross-sectional area as the fluidized bed; thus, a fluidized bed having a horizontal cross-section of 100 square feet would have an effective diameter of about 11.3 feet regardless of the shape of the horizontal cross-section. In a fluidized catalyst catalytic cracking process where the depth of the fluidized bed is in the order of 10–15 feet such a reactor would afford a fluidized bed having a ratio of depth to diameter of about 1. Such a reactor would, however, afford only a very moderate throughput capacity and in practice reactors of much larger diameter are frequently required. The ratio of the depth to the diameter in the fluidized bed is, therefore, less than 1. For example, in a fluidized catalyst catalytic cracking plant of 15,000 barrels per day capacity the reactor is about 23 feet in diameter and the regenerator is about 40 feet in diameter. These vessels are in the form of vertically disposed cylinders having conical bottom sections, the slope of the conical bottom sections being somewhat above the angle of repose of the catalyst. In a typical vessel the conical section is about 20 feet in length.

By introducing the gas, e. g. hydrocarbon oil vapor in air, at the bottom (apex) of the conical section a considerable distribution of the gas over the cross-sectional area of the fluidized bed is obtained. However, good distribution cannot be obtained without an appreciable pressure drop which is not provided by the conical section. In order to properly distribute the gas the required pressure drop was obtained through the use of a multi-jet arrangement such as illustrated diagrammatically in U. S. Patent No. 2,386,491. This arrangement, however, was generally considered relatively inefficient and in the newer plants the required pressure drop is obtained by the use of a so-called grid placed across the vessel at about the junction of the conical and cylindrical sections. The grid may be of any desired construction, but is usually in the form of large steel plates perforated with small holes or a grid of girders having a width of, for example, 22 inches, spaced to leave narrow slots between them. The open area of the grid is less than 10% of the total area. Due to the restriction of the flow of the gaseous fluid there is an appreciable pressure drop across the grid and the bed of fluidized finely divided solid remains above the grid during operation.

In the fluidized bed the pseudo-liquid powder is in a violent state of agitation. In fluidized beds of relatively high ratio of depth to diameter the possibility for horizontal motion is limited by the chamber walls and the possibility for any appreciable localized variation from the average condition is, therefore, minimized. In fluidized beds having a low ratio of depth to diameter, however, the possibilities for horizontal motion are much greater and any localized variation from the average condition can set up a relatively large circulation pattern. Thus, if, due to the violent agitation, a localized zone of low density forms, the pressure drop through the bed at this point is momentarily decreased. This tends to increase the flow of gaseous fluid at this point. In a bed having a high ratio of depth to diameter any such abnormal condition is quickly quenched by the violent agitation, whereas in a bed having a low ratio of depth to diameter such a zone, once established, can wander over the cross-section of the bed for an appreciable time before being dissipated. This condition becomes pronounced when the ratio of the depth to the diameter is below 1.

Such temporary localized zones of low density and high superficial gas velocity are undesirable for several reasons. Such a zone often tends to set up a relatively large and sometimes quite stable circulation pattern in the bed. Although such circulation patterns have not to my knowledge been previously observed in large fluidized beds of catalyst, their presence has been suspected and more or less confirmed by uneven erosion in the contacting chamber. Attempts have been made to correct such circulation, where it was evidenced, by reconstructing the distribution grid to counteract the indicated circulation, but this has merely shifted the circulation pattern. The only solution to the problem so far known is to divide the fluidized bed into a number of smaller beds, as shown, for example, in U. S. Patent No. 2,359,310, but from the engineering standpoint this solution is not practicable for large chambers of the type in question, particularly in view of the large pressure drops encountered.

Such temporarily localized zones of low density and high superficial gas velocity are also undesirable since they are largely responsible for the carry over. For example, if the superficial gas velocity for the entire bed is in the desired range, e. g. below 1.3 feet per second in the case of the particular material illustrated in Figure I of the drawing, the amount of carry-over is small and practically independent of the gas velocity. If, however, the superficial gas velocity is markedly increased, even in small wandering area, the carry-over is greatly increased.

It has now been found that the mentioned difficulties may be avoided or diminished without increasing the pressure drop through the contacting zone by breaking the inlet stream of gaseous fluid into a number of smaller, confined streams of substantially the equivalent total cross-section, and directing the confined smaller streams to spaced points distributed over the grid area. The various particulars of the method will be pointed out in connection with the description of the apparatus.

One form of suitable arrangement is illustrated diagrammatically in Figure II of the drawing. This figure shows an elevation, partly in section, of only the pertinent lower portion of a fluid catalyst regenerator. The catalyst, although present, is not shown. Referring to Figure II, the cylindrical shell of the vessel is partly shown at 1. Below the cylindrical portion is the conventional conical section 2. A conventional grid 3 is placed horizontally across the vessel at approximately the level of the junction of the cylindrical and conical sections. The air for the regeneration is supplied through the conduit 4 which enters the bottom of the conical section. In the conventional design the conduit 4 ends substantially at the junction with the cone. The incoming air then passes up through the cone and is distributed over the cross-section of the cylindrical section by the pressure drop through the grid. This pressure drop is usually in the order of 1 pound per square inch. In order to counteract for the slight inequality between the distances from the end of conduit 4 to the center and peripheral portions of the grid, the open area of the grid is sometimes made slightly larger near the periphery.

In the arrangement illustrated in Figure II, on the other hand, conduit 4 is extended into the conical section and then divided into a number of smaller conduits 5. These conduits 5 have a combined cross-sectional area substantially equivalent to the cross-sectional area of conduit 4 and therefore do not cause any appreciable pressure drop. The conduits 5 lead radially toward, but below, different spaced areas of the grid, as illustrated. The gas streams thus approach the grid at an angle from the perpendicular. While as few as three conduits may be used, it is preferable to supply one conduit for at least each 150 square feet of grid area. The conduits may all have the same diameter, or different diameters.

The conduits 5 may be larger or smaller than illustrated, but should be of sufficient length to lend direction to the streams of gas passing through them. It is not the purpose of the conduits 5 to blast the incoming gas against different portions of the grid and in order to prevent such a condition the ends of the conduits are kept sufficiently below the grid to allow the kinetic energy of the gas and any suspended solids to become dissipated. A space of 4 feet is sufficient for this purpose in the usual case where the pressure drop through the grid is in the order of 1 pound per square inch and no appreciable pressure drop is caused by the conduit system in question.

The arrangement illustrated in Figure II affords a substantial improvement over the conventional reactor design and has the advantage that it can be applied in existing plants with a minimum amount of alteration.

Another arrangement affording the desired advantages is illustrated in the drawing, Figure III. This figure, like Figure II, is a diagrammatic vertical section of only the lower pertinent portion of the contact chamber. The apparatus illustrated in Figure III is essentially similar to that illustrated in Figure II except that an elliptical head is provided in place of the conventional conical section and the smaller conduits 5 are, therefore, outside, rather than inside, the vessel. This design has three main advantages over the design illustrated in Figure II. The first is that with the elliptical bottom closure it is easier and cheaper to construct a vessel capable of operating under superatmospheric pressure. The second is that the dead space in the bottom of the conical section is eliminated. The third is that with the conduits outside of the vessel it is possible to equip them with suitable butterfly valves or damper means 7 which can be adjusted during the operation to correct any maldistribution which may develop due to erosion of the grid or other causes.

Example

A conventional regenerator in a fluidized catalyst catalytic cracking plant had a cylindrical section 40 feet in diameter and 35 feet high and top and bottom conical sections about 19 feet in length. The regenerator was equipped with a grid containing 2 inch by 6 inch orifices spaced about 10 inches between centers in one direction and 24 inches between centers in the direction at right angle to the first. The open area of the grid was, therefore, about 3% of the total area. The operation of this regenerator was steady and normal, as indicated by a substantially uniform oxygen content of the exit gas between about 1.5% and 2.0%.

Specially constructed plugs were put through the outer steel shell and the inner refractory lining of the vessel at various points and specially constructed probes were inserted to withdraw samples from different positions in the fluidized bed. It was found that while the conditions in the regenerator as a whole were substantially constant, the conditions at a given point fluctuated considerably, indicating temporary, localized (perhaps wandering) areas of low and high density.

The air inlet line was then extended up into the conical section in the form of nine radiating lines ending eleven feet below the level of the bottom of the grid. Four of the smaller lines spaced 90° apart, had a diameter of 24 inches; four others, likewise symmetrically placed, were of 14 inch diameter; the ninth was 18 inches in diameter and placed vertically. The combined cross-sections of the nine conduits, therefore, substantially equalled the cross-section of the original conduit (5 foot diameter).

After modifying the regenerator as indicated the tendency for the formation of localized abnormal conditions in the fluidized bed was diminished with a resulting overall increase in the efficiency of the regeneration, as indicated, for example, by a decrease in the oxygen content of the flue gas and an increase in the coke burning capacity of about 1,250 lbs. per hour. With this arrangement it is possible to operate satisfactorily with a pressure drop across the grid in the low order of 0.5 pound per square inch, thus materially decreasing the cost of compression of the large amounts of air required.

For the reasons pointed out the process and apparatus of this invention are considered to be advantageous and useful only in instances where a substantial pressure drop is maintained across a grid having an open area less than about 10% of the total area to distribute a gaseous fluid into a fluidized (pseudo-liquid) bed of finely divided solid having a ratio of depth to diameter below about 1. In cases where this ratio is above 1, and in cases where the contacting zone above the grid is empty of solids or filled with non-fluidized solids, e. g. catalyst pellets, the localized abnormal conditions of the type described do not exist. If maldistribution is present in these cases it is due to other causes, is relatively fixed and permanent, and requires other corrective measures.

I claim as my invention:

1. An apparatus for contacting a gaseous fluid with a finely divided solid catalyst which comprises in combination, a vertically disposed cylindrical chamber having a conical bottom closure, a horizontally disposed gas distribution grid having less than 10% of open area and located at substantially the top of said bottom closure, a gaseous fluid inlet conduit entering said bottom closure below said gas distribution grid, a plurality of open-ended gas directing conduits having a combined cross-sectional area substantially equal to the cross-sectional area of said gaseous fluid inlet conduit, said gas directing conduits leading radially from said gaseous fluid inlet conduits towards the periphery of said gas distribution grid but terminating at points at least 4 feet below said gas distribution grid.

2. An apparatus for contacting a gaseous fluid with a finely divided solid catalyst which comprises in combination a vertically disposed cylindrical chamber adapted to contain a bed of said finely divided solid catalyst to be contacted, said bed having a depth less than its diameter, a gas distribution grid mounted at substantially the bottom of said cylindrical chamber, a bottom closure below said gas distribution grid, said grid and bottom closure defining a single continuous space, a gaseous fluid inlet line entering said space through said bottom closure, a plurality of open-ended conduits within said space, said conduits having a combined cross-sectional area substantially equal to the cross-sectional area of said gaseous fluid inlet line, said open-ended conduits communicating with the discharge end of the said gaseous fluid inlet line and radiating therefrom to points at least 4 feet below said grid.

ALPHA STEVENS GILLIAM.

REFERENCES CITED

The following references are of record in the file of this patent:

UNITED STATES PATENTS

| Number | Name | Date |
|---|---|---|
| 2,371,619 | Hartley | Mar. 20, 1945 |
| 2,379,734 | Martin | July 3, 1945 |
| 2,386,169 | Peery | Oct. 2, 1945 |
| 2,386,491 | McOmie | Oct. 9, 1945 |
| 2,404,944 | Brassert | July 30, 1946 |
| 2,409,780 | Mekler | Oct. 22, 1946 |
| 2,421,212 | Medlin | May 27, 1947 |
| 2,425,532 | Hemminger | Aug. 12, 1947 |
| 2,468,508 | Munday | Apr. 26, 1949 |